United States Patent Office 2,875,039
Patented Feb. 24, 1959

2,875,039
METHOD OF LEACHING UNREDUCED IRON-CONTAINING TITANIFEROUS ORES

John H. Bachmann, Akron, Ohio, assignor to Columbia-Southern Chemical Corporation, a corporation of Delaware No Drawing. Application August 26, 1955
Serial No. 530,877

5 Claims. (Cl. 75—101)

The instant invention relates to the leaching or extraction of iron from iron-containing titaniferous ores, and more particularly pertains to an improved method for leaching such ores with hydrochloric acid.

One of the more important means for obtaining titanium tetrachloride involves chlorinating the titanium components of an iron-containing titaniferous ore. Chlorination of the titanium component usually utilizes elemental chlorine as the chlorinating agent. Substantial amounts of iron in the chlorinated titaniferous ores are undesirable and consequently, the art has sought expedients for extracting the iron component prior to chlorinating the titaniferous ores.

Various processes whereby iron may be separated from iron-containing titaniferous ores are described in the literature. According to one process detailed in U. S. Letters Patent 2,088,913, the iron components are removed from titaniferous ores by treatment with hydrochloric acid at temperatures ranging up to about 90° C. to 100° C. This process, however, is not entirely efficient according to present experiences, primarily because the separation of the iron component is either accompanied by loss of a substantial quantity of the ore's titanium components or because the removal of iron components is incomplete, leaving considerable iron behind with the titanium containing material. Other processes often require a pretreatment of the ore, usually a reduction treatment, prior to leaching. Avoidance of this step is an economic advantage.

According to the present invention, the above enumerated objections to the prior art processes for extracting iron from unreduced iron-containing titaniferous ores are substantially obviated. By following the principles of the present invention it is possible to extract essentially all of the iron components from an unreduced iron-containing titaniferous ore without simultaneously removing any significant quantity of titaniferous material along with the extracted iron component. Thus, upwards of 96 percent, and frequently 100 percent, of the iron may be removed without removing any consequential quantity of titanium equivalents therewith.

Now it has been found that unusually efficient extraction of iron from an unreduced iron-containing titaniferous ore may be accomplished by leaching the ore with hydrochloric acid at temperatures of at least about 175° C. and at superatmospheric pressure. Thus, iron-containing titaniferous ores may be treated according to the present invention with hydrochloric acid at a temperature of at least 175° C. while maintaining sufficient pressure on the system to maintain a liquid pool of hydrochloric acid. Temperatures ranging up to, but not including, those at which hydrochloric acid will chlorinate titanium materials, notably titanium dioxides in the ore, are operable. However, at these high temperatures the superatmospheric pressures required to maintain a liquid pool of hydrochloric acid are excessively high and mitigate economically against such elevated temperatures. For practical purposes, temperatures ranging upwards of about 175° C. to about 300° C. are favored.

As will hereinafter become more apparent, the effectiveness of the present process for separating the iron and titanium components of an ore depends upon leaching with hydrochloric acid at temperatures not substantially below 175° C. Thus, temperatures on the order of between 120° C. and 150° C. are inadequate. With such lower temperatures, incomplete removal of the iron results as well as substantial titanium equivalents accompanying the removed iron.

In practice, the present invention may be conducted by recourse to various techniques and apparatus. A typical procedure involves charging an autoclave or other pressure reactor with an iron-containing titaniferous ore ground to a relatively fine state of sub-division along with hydrochloric acid. The quantity of hydrochloric acid is judiciously selected to provide a substantial stoichiometric excess over that required for conversion of the iron component to its respective chloride; a typical stoichiometric excess is the range of from 200 to 400 percent, and notably 300 percent excess. After being charged, the autoclave is sealed and heated, by conventional heat exchange techniques such as introducing a suitable heating medium in a jacket surrounding the autoclave, such that the contents of the autoclave are at a temperature in excess of 175° C. If the autoclave is charged with a sufficient volume of ore and hydrochloric acid such that at the leaching temperature, a substantial pool of hydrochloric acid remains present, the autogenous pressure is adequate. If desired or necessary, the system may be externally pressurized, although most commercial applications prefer to rely upon autogenous pressures.

As long as the temperature is sufficiently high, e. g. above about 175° C., the particular pressure may be varied, although higher pressures may facilitate the rate at which leaching is consumated. Initial calculated pressures ranging from about 35 atmospheres and upwards are usually employed, with practical considerations restricting the upper limit to pressures which require the least expensive equipment. By initial calculated pressure, as herein defined, is meant the pressure autogenously developed at the reaction temperature, taking into account the quantity of hydrochloric acid charged initially.

The contents of the autoclave are maintained at the desired temperature and superatmospheric pressure for extended time periods, usually at least one or several hours and often for periods of 10 to 24 hours to achieve effective iron extraction. It should be appreciated that the particular time period which is most effective and efficient will be to at least some extent interrelated with various physical conditions in the system such as the concentration of the hydrochloric acid, the temperature, and the superatmospheric pressure. Likewise, the state of subdivision of the titaniferous ore and the degree of agitation to which the leach mixture is subjected have a bearing on the optimum reaction time.

At the conclusion of the reaction, the contents of the autoclave are suitably cooled and removed for further processing. The extracted iron components find their way into the liquid phase, probably as acid soluble iron chlorides. On the other hand, the titaniferous components of the ore (probably as titanium oxides, especially titanium dioxide) are in the solid state and apparently do not dissolve; consequently, they may be physically separated by conventional mechanical separation expedients, e. g. filtration, centrifugation, and settling. If desired, the solid phase, subsequent to separation, may be washed with water or with hydrochloric acid or the like. The washed titanium components often constitute a crude titanium dioxide.

The following examples illustrate the manner in which the present invention may be practiced:

EXAMPLE I

A three gram sample of ball-milled Indian ilmenite containing by weight 6.2 percent FeO, 25.9 percent $Fe_2O_3$, and 59.86 percent $TiO_2$, along with a 300 percent stoichiometric excess (based on the iron content of the ilmenite) of hydrochloric acid containing 36 percent by weight hydrogen chloride were charged to a heavy glass wall tube 9 inches long and having an internal diameter of ½ inch. After charging, the tube was sealed and placed inside an iron pipe. In a muffle furnace, this pipe was heated to the indicated temperature in Table I, and rotated throughout the reaction period for the time specified in Table I. Subsequently, the glass tube was cooled to room temperature, broken and the solid contents washed with distilled water. The contents were then analyzed to determine the quantity of iron removed in the hydrochloric acid medium, along with the titanium in the liquid medium. The titanium components recovered by physically separating the solids are in the form of titanium dioxide, and are grey-white in color. Table I lists the data:

Table I

| Experiment No. | Reaction Time (Hrs.) | Temp., °C. | Pressure,[1] Atmospheres | Weight Percent[2] Fe Removed | Weight Percent[2] Ti Removed |
|---|---|---|---|---|---|
| 1 | 6 | 120 | 12 | 48 | 32 |
| 2 | 13 | 150 | 29 | 60 | 19 |
| 3 | 12 | 175 | 40 | 96 | <1 |
| 4 | 16 | 175 | 40 | 98 | 0.4 |

[1] Initial calculated pressure.
[2] Weight percent removed in the liquid based on the amount originally in the ore.

EXAMPLE II

Following the exact procedure of Example I except that the solid contents of the reaction mixture were washed with hydrochloric acid containing 36 percent by weight of hydrogen chloride, the following results were obtained:

Table II

| Experiment No. | Reaction Time (Hrs.) | Temp., °C. | Pressure,[1] Atmospheres | Weight Percent[2] Fe Removed | Weight Percent[2] Ti Removed |
|---|---|---|---|---|---|
| 1 | 16 | 175 | 40 | 96 | <1 |
| 2 | 16 | 150 | 29 | 61 | 16 |
| 3 | 16 | 120 | 12 | 55 | 36 |

[1] Initial calculated pressure.
[2] Weight percent removed in the liquid based on the amount originally in the ore.

From the foregoing, the importance of leaching unrefined titaniferous ores with hydrochloric acid at temperatures in excess of about 175° C. is clearly demonstrated. Thus, at temperatures of 120° C. and 150° C., other conditions being the same, iron removal was incomplete. Also, substantial quantities of titanium were extracted along with the iron. By comparison at temperatures of 175° C., for all practical purposes, the iron was completely removed, while at most, but insignificant quantities of titanium accompanied the removed iron.

It appears that the rate at which the extraction of the iron is accomplished in the present process depends, at least to some extent, upon the physical conditions to which the reaction mixture is subjected. Thus, the reaction time may be shortened by subjecting the mixture to substantial and effective agitation, as by mechanically stirring the mixture.

All types of unreduced iron-containing titaniferous ores may have their iron contents extracted according to the present invention. Thus, iron-containing titaniferous ores having more or less iron than is present in ilmenite such as rutile-bearing ilmenite having a content of titanium dioxide ranging from about 35 to 90 percent are susceptible of use in titanium concentration by the present process since the titanium dioxide content of such ores may be increased to 96 percent or higher. By an unreduced iron-containing titaniferous ore is meant ore in a state wherein it has not been subjected to reducing conditions whereby at least a major portion of the iron content is present as ferrous compounds. Thus, as herein intended, an unreduced ore is one in which a substantial portion, and preferably at least 50 percent by weight of the iron components are present as ferric compounds.

As hereinbefore indicated, the titaniferous ore, prior to treatment with the hydrochloric acid, should be in a finely divided state of subdivision. By ball milling or otherwise mechanically subdividing the ore, a suitably fine state of subdivision may be provided. When the titaniferous ore is finely divided so that all of its particles are finer than about 200 mesh, the ore is most advantageously subdivided.

To some extent, the concentration of the hydrochloric acid employed may influence the time required for appropriate leaching. Most rapid extraction or leaching may be accomplished when concentrated hydrochloric acid is employed, e. g. hydrochloric acid containing in the range of from about 25 to 40 percent by weight of hydrogen chloride. However, more dilute hydrochloric acid solutions are useful within the broader operational conditions of the present invention.

Although the present invention has been described with reference to specific details of certain embodiments, it is not intended that the invention be construed as being limited to such details except insofar as they are included in the appended claims.

I claim:

1. A method of leaching the iron content from an unreduced iron-containing titaniferous ore wherein the major portion of the iron content of said ore is in its unreduced ferric state which comprises leaching the ore with hydrochloric acid at a temperature of at least 175° C. and at superatmospheric pressure and thereafter mechanically separating the solubilized iron component.

2. The method of leaching the iron content from an unreduced iron-containing titaniferous ore wherein the major portion of the iron content of said ore is in its unreduced ferric state which comprises leaching said ore with concentrated hydrochloric acid at a temperature of at least 175° C. under a superatmospheric pressure, whereby to selectively solubilize the iron component of the ore, and thereafter mechanically separating said solubilized iron component.

3. The method of leaching the iron content from an unreduced iron-containing titaniferous ore wherein the major portion of the iron content of said ore is in its unreduced ferric state which comprises leaching said ore with concentrated hydrochloric acid at a temperature of at least 175° C. under superatmospheric pressure sufficient to maintain a liquid pool of hydrochloric acid for a period of several hours, whereby to selectively solubilize the iron component of the ore in the liquid pool of hydrochloric acid and thereafter mechanically separating said liquid.

4. A method of leaching the iron content from an unreduced iron-containing titaniferous ore wherein the major portion of the iron content of said ore is in its unreduced ferric state and said ore has a titanium dioxide content ranging from 35 to 90 percent by weight which comprises treating said ore with concentrated hydrochloric acid at a temperature above 175° C. under superatmospheric pressure sufficient to maintain a liquid pool of hydrochloric acid in contact with the ore whereby to selectively solubilize the iron component of the ore in the liquid pool and thereafter mechanically separating said liquid.

5. A method of leaching the iron content from an unreduced iron-containing titaniferous ore wherein the major portion of the iron content of said ore is in its unreduced ferric state which comprises maintaining a liquid pool of hydrochloric acid containing said ore at a temperature in excess of 175° C. for an extended period of time whereby to selectively solubilize essentially all of the iron component of the ore and thereafter separating the liquid phase.

References Cited in the file of this patent

UNITED STATES PATENTS

| | | |
|---|---|---|
| 981,451 | McKechnie et al. | Jan. 10, 1911 |
| 2,406,577 | Allessandroni et al. | Aug. 27, 1946 |
| 2,476,453 | Pierce et al. | July 19, 1949 |
| 2,527,257 | Judd | Oct. 24, 1950 |